(12) United States Patent
Dalla Lana et al.

(10) Patent No.: US 6,432,375 B1
(45) Date of Patent: Aug. 13, 2002

(54) METHOD FOR REMOVING HYDROGEN SULFIDE FROM GAS STREAMS

(76) Inventors: Ivo Giovanni Dalla Lana, 4928 - 126 St., Edmonton, AB (CA), T6H 3W2; Kar Tze-Tang Chuang, 8742 - 117 St., Edmonton, AB (CA), T6G 1R5

(*) Notice: Subject to any disclaimer, the term of this patent is extended or adjusted under 35 U.S.C. 154(b) by 1617 days.

(21) Appl. No.: 08/763,352

(22) Filed: Dec. 11, 1996

Related U.S. Application Data

(63) Continuation of application No. 08/639,480, filed on Apr. 29, 1996, now abandoned, which is a continuation of application No. 08/376,092, filed on Jan. 20, 1995, now abandoned, which is a continuation of application No. 08/198,790, filed on Feb. 18, 1994, now abandoned.

(51) Int. Cl.$^7$ ................................................ C01B 17/05
(52) U.S. Cl. .............................. 423/573.1; 423/243.01; 423/576.4; 48/127.5
(58) Field of Search ..................... 423/220, 242.1, 423/243.01, 522, 573.1, 576.4; 48/127.5

(56) References Cited

U.S. PATENT DOCUMENTS

| | | | | |
|---|---|---|---|---|
| 1,560,380 A | * | 11/1925 | Hedouville et al. | 423/573.1 |
| 3,632,314 A | * | 1/1972 | Torrence | 23/224 |
| 3,639,265 A | * | 2/1972 | Johnson | 252/411 R |
| 3,849,540 A | * | 11/1974 | Maddox, Jr. et al. | 423/224 |
| 3,917,799 A | * | 11/1975 | Torrence et al. | 423/244 |
| 4,579,727 A | * | 4/1986 | Cronkright et al. | 423/573 R |

OTHER PUBLICATIONS

Mellor "Inorganic and Theoretical Chemistry" vol. X, Longmans, Green & Co. London, (first published 1930, no month) p. 142.*

* cited by examiner

Primary Examiner—Steven P. Griffin
Assistant Examiner—Timothy C. Vanoy
(74) Attorney, Agent, or Firm—Birch, Stewart, Kolasch & Birch, LLP

(57) ABSTRACT

The invention disclosed relates to a process for removing hydrogen sulfide from a gas stream, such as sour natural gas, with the formation of elemental sulfur as a by-product. By controlling the reaction conditions, the conversion of hydrogen sulfide is maximized, and the sulfur dioxide selectivity is controlled. Specifically, the sulfuric acid concentration and the reaction temperature may be balanced, depending on the desired product mix.

17 Claims, 4 Drawing Sheets

METHOD FOR REMOVING HYDROGEN SULFIDE FROM GAS STREAMS

This application is a continuation, of Ser. No. 08/639,480, filed Apr. 29, 1996, now abandoned, which in turn was a continuation of Ser. No. 08/376,092, filed Jan. 20, 1995, now abandoned, which in turn was a continuation of Ser. No. 08/198,790 filed Feb. 18, 1994, now abandoned.

FIELD OF THE INVENTION

This invention relates to a method for removing hydrogen sulfide($H_2S$) from a gas stream such as sour natural gas and acid gases, with the formation of elemental sulfur as a by-product.

BACKGROUND OF THE INVENTION

It is well-known that numerous large untapped reserves of natural gas containing $H_2S$ currently exist, rendering such gas unsuitable for most uses. $H_2S$-containing gas streams also originate in petroleum refineries and natural gas processing plants. Moreover, some natural gas reservoirs containing only a few percent of $H_2S$ have been kept shut-in because the high cost of removal of $H_2S$ and its conversion to sulfur exceeds the market value of the gas. Removal of $H_2S$ from such gas streams is necessitated by the high demand for such clean energy sources, by the value of sulfur as a by-product and by the need to regulate emmissions to meet air pollution standards.

DESCRIPTION OF THE PRIOR ART

It is known that $H_2S$ can be removed from a gas stream by absorption using an amine such as an alkanolamine. The two alkanolamines which are most commonly used are monoethanolamine and diethanolamine. After desorption of the $H_2S$, the modified Claus process is typically used to convert $H_2S$ to sulfur. A furnace, two catalytic reactors and a clean-up unit may be operated in series to achieve sulfur recovery. However, this process is both capital and energy intensive. Further, the Claus process requires moderate to high concentrations of $H_2S$, i.e above 30%, in the feed.

In U.S. Pat. No. 3,849,540, a process for removing $H_2S$ from natural gas is disclosed in which the $H_2S$ is removed by catalytic means. Specifically, the natural gas is treated with an aqueous solution containing dissolved oxygen and a transition metal catalyst.

In U.S. Pat. No. 3,761,569, a method for removing $H_2S$ from a gas stream is disclosed in which the $H_2S$-containing gas is passed through a solution of cupric ions in a strong acid in the presence of oxygen. One of the acids disclosed is sulfuric acid, although the only examples are directed to the use of hydrochloric acid. This method fails if both oxygen and cupric ions are absent. It will also be appreciated by those skilled in the art that the presence of substantial amount of oxygen in such an environment is detrimental from both a corrosion and safety standpoint.

SUMMARY OF THE INVENTION

It is an object of the invention to provide a method for the removal of $H_2S$ from a gas stream, such as sour natural gas or $H_2S$-containing acid gases.

It is another object of the invention to provide such a method in which elemental sulfur is preferentially formed.

Accordingly, a method for the removal of $H_2S$ from a gas stream is provided, comprising contacting the gas stream with sulfuric acid under conditions which preferentially favor the formation of elemental sulfur.

The method according to the invention is suitable for the removal of $H_2S$ from many gas streams, such as sour natural gas, petroleum refinery gas and inert gases, such as nitrogen gas, but is particularly well-suited to the removal of $H_2S$ from low-level $H_2S$-containing natural gas streams i.e. those containing less than 5 mol % of $H_2S$. However, the process has also been found to be applicable to gas streams containing concentrations of $H_2S$ of up to about 80%/w.

For example, for the production of elemental sulfur the following chemical reaction (1) is favored:

$$3H_2S+H_2SO_4 \rightarrow 4S+4H_2O \quad (1)$$

However, when flexibility in the product mix is of interest, the following chemical reaction (2) is favored:

$$H_2SO_4+H_2S \rightarrow S+SO_2+2H_2O \quad (2)$$

That is, high conversion to elemental sulfur, accompanied by little or no conversion to $SO_2$ is desired when sulfur production is paramount. To provide a feed for sulfuric acid production, complete conversion to $SO_2$ would be optimal.

Applicants have found that higher concentrations of sulfuric acid and lower reaction temperatures favor formation of elemental sulfur, whereas lower concentrations of sulfuric acid and higher temperatures lead to increased formation of $SO_2$. Accordingly, depending on the $H_2S$ content of the gas stream and the desired product mix, an appropriate balance between sulfuric acid concentration and reaction temperature is provided.

Defining $SO_2$ selectivity as the percentage of $H_2S$ reacted to form $SO_2$, for sulfur production, the treatment of sour natural gas would preferentially seek a 100% conversion of $H_2S$ and a 0% $SO_2$ selectivity. To generate an $SO_2$ feed for a sulfuric acid plant, 100% $H_2S$ conversion and 100% $SO_2$ selectivity would be preferable.

More specifically, the applicants have found that by maintaining the reaction temperature between 22 and 125° C. and the concentration of sulfuric acid between 80 and 96 weight per cent (wt %) (That is, between 80 and 96 wt % of concentrated sulfuric acid, the balance being water) the mix of products from reaction (2) may be varied in $SO_2$ selectivity from 0 to 100%.

Preferably, the concentration of acid should be maintained between 82 and 96 wt %.

To further optimize the method, a reaction temperature of 20 to 150° C., preferably 120 to 130° C. and most preferably 125 to 127° C. is provided.

The flow rate/contact time may also be controlled to further optimize the method. Flow rates of between 26 and 260 SCCM per 500 g of $H_2SO_4$ have been found useful, with rates nearer to the lower limit being preferred.

DESCRIPTION OF PREFERRED EMBODIMENTS OF THE INVENTION

Two embodiments of an appropriate apparatus for carrying out the method according to the invention are now described.

Figure 1:
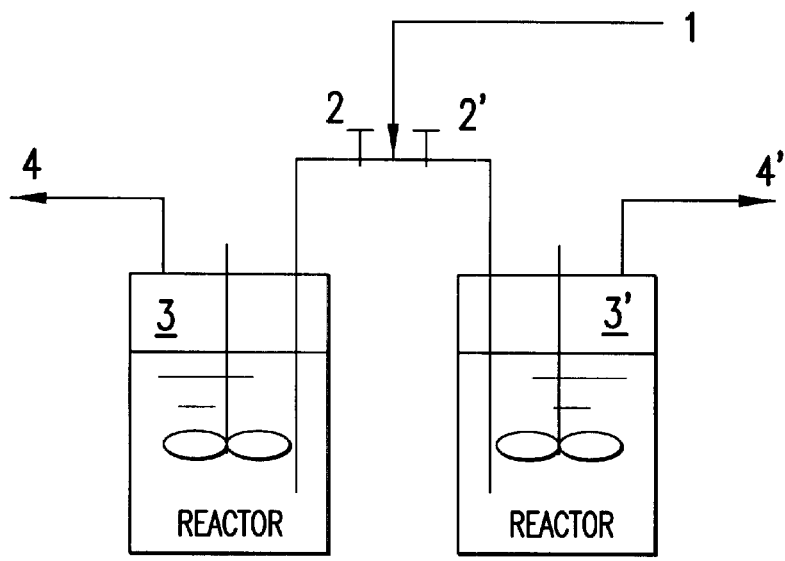
FIG. 1 is a schematic flow drawing of one embodiment of an apparatus for carrying out the method according to the invention.

In the apparatus schematically illustrated in FIG. 1, two autoclave reactors 3 and 3' are provided, containing sulfuric acid. In a first stage of operation, a $H_2S$-containing gas (natural gas) is fed to reactor 3 via feed inlet 1 and valve 2. The gas stream is bubbled through the acid under agitation to effect the conversion of $H_2S$ to elemental sulfur. The clean gas stream comprising natural gas which is essentially free of $H_2S$ (generally less than 4 ppm), exits the system via outlet 4. With time, the by-product elemental sulfur accumulates in the reactor, while the concentration of the sulfuric acid decreases. After a predetermined operating time, the operation is shifted to reactor 3' by closing valve 2 and opening valve 2'. By the time that reactor 3' is in operation, the acid medium in reactor 3 is heated to remove the elemental sulfur and the concentration of the sulfuric acid is increased to the appropriate level e.g. by adding fresh acid. Accordingly, a continuous procees is achieved by alternately operating the two reactors.

Figure 2:
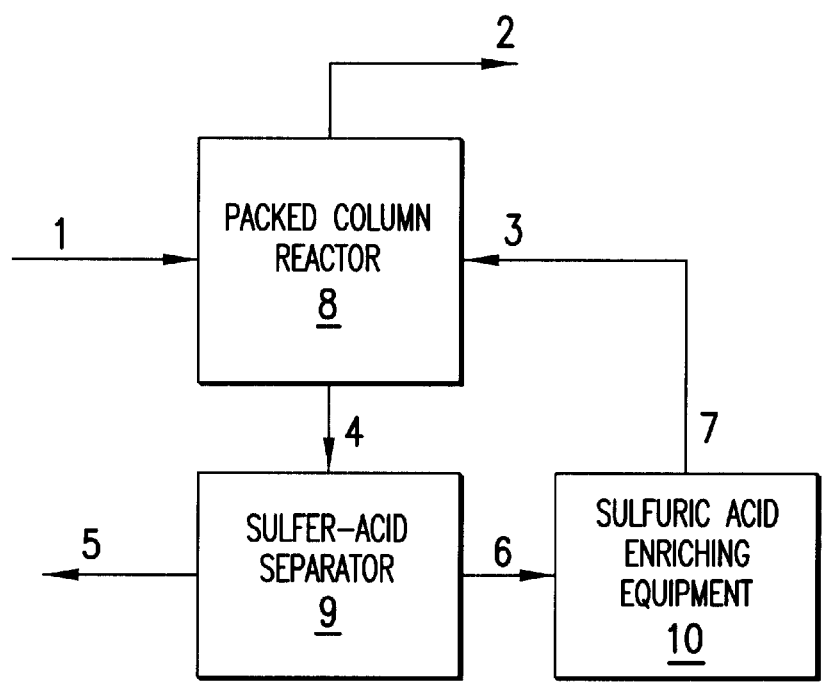
FIG. 2 is a schematic flow drawing of another embodiment of an apparatus for carrying out the method according to the invention.

The FIG. 2 apparatus includes a packed column reactor 8 containing suitable conventional packing materials to provide sufficient gas-liquid contact area, resist acid-corrosion and operating at a temperature above 120° C., i.e. above the melting point of sulfur. This minimum temperature is required to avoid plugging of the column materials by solid sulfur. A sulfur-acid separator 9 and acid-enriching equipment 10 are also provided. The reactor 8 has a gas feed inlet 1, a clean gas outlet 2, an acid medium inlet 3 and a downstream acid medium outlet 4. The outlet 4 is connected to the sulfur-acid separator 9, which has a sulfur product outlet 5 and an acid outlet 6 connected to the acid enriching equipment 10. The enriched acid medium is re-circulated through outlet 7 to the reactor 8 via acid medium inlet 3.

In operation, the H2S-containing gas stream is fed into the reactor 8 via feed inlet 1. The sulfuric acid medium is sprayed into the reactor through acid medium inlet 3. Inside the reactor, the gas and liquid streams contact each other either co-currently or counter-currently, to effect the gas-liquid reaction converting $H_2S$ to elemental sulfur. The resultant gas stream flows out of the reactor via clean-gas outlet 2, ready for use or ventilation. The liquid phase including the by-product elemental sulfur enters the sulfur-acid separator 9, wherein the sulfur is separated by heating to above the melting point of sulfur i.e. above 120° C. The separated sulfuric acid medium is then transported to the acid-enriching equipment wherein the concentration of the sulfuric acid is adjusted to the required level e.g. by adding fresh sulfuric acid, and re-circulated to the reactor via acid medium inlet 3. Alternatively, the entire operation is carried out above 120° C. so that sulfur does not precipitate as a solid within the equipment.

EXAMPLES

Figure 3:
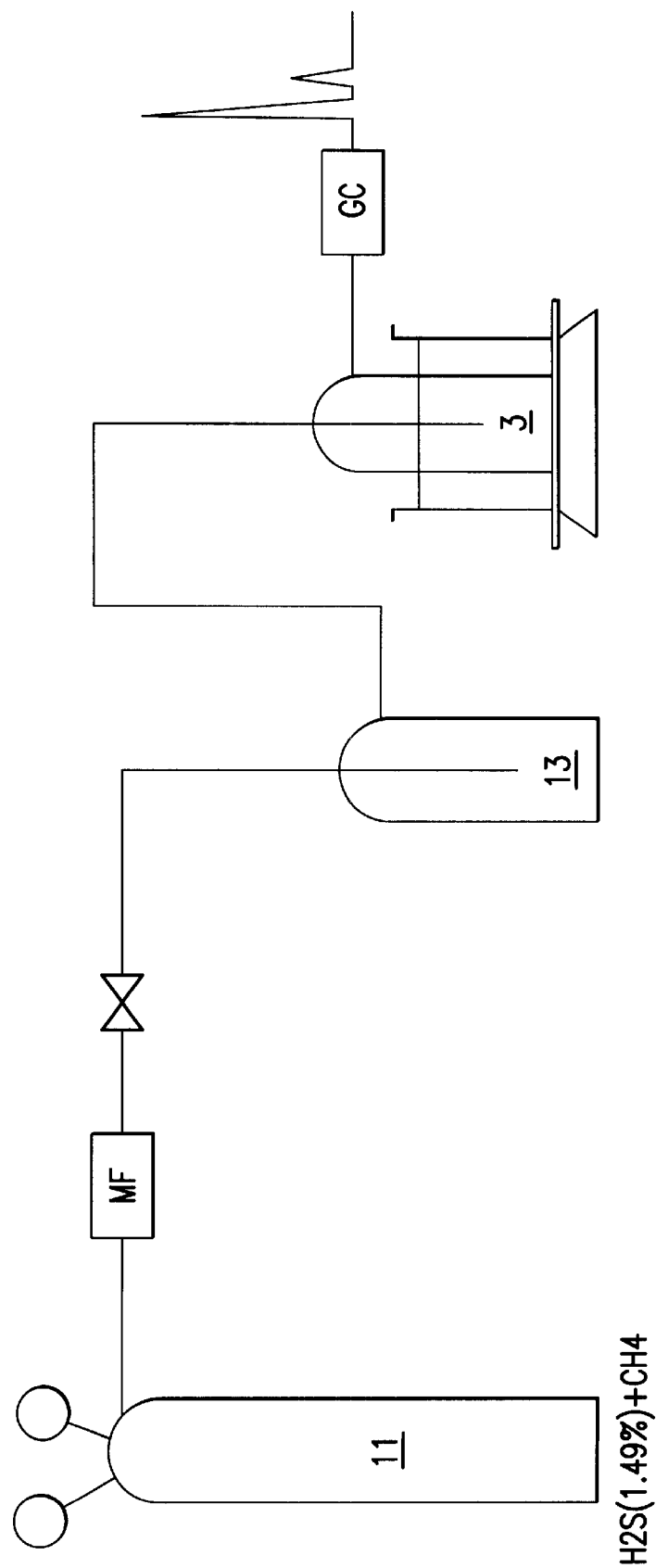
FIG. 3 is a schematic drawing illustrating a laboratory scale apparatus used to illustrate the performance of the method according to the invention.
Figure 4:
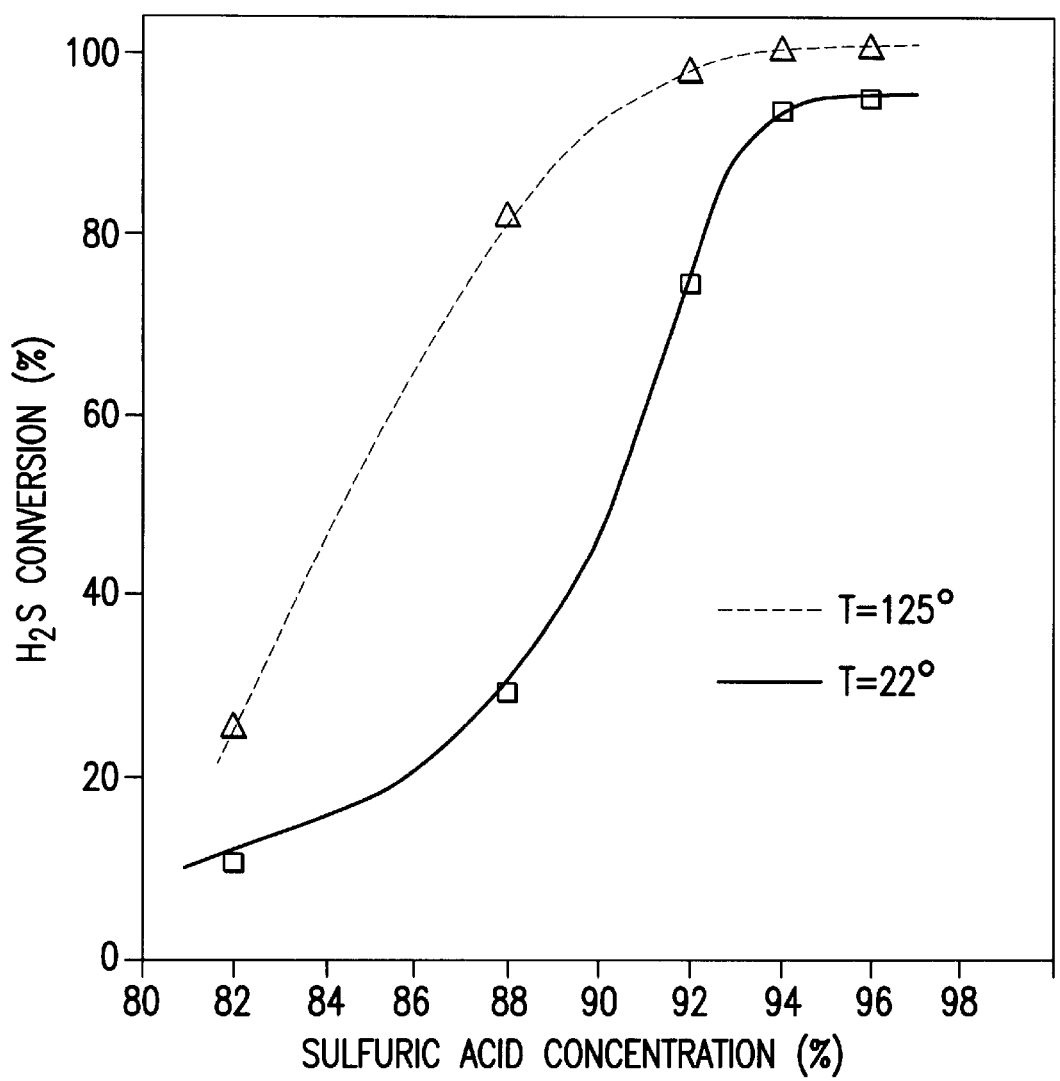
FIGS. 4 and 5 are graphs illustrating the performance of the method according to the invention using the apparatus of FIG. 3.
Figure 5:
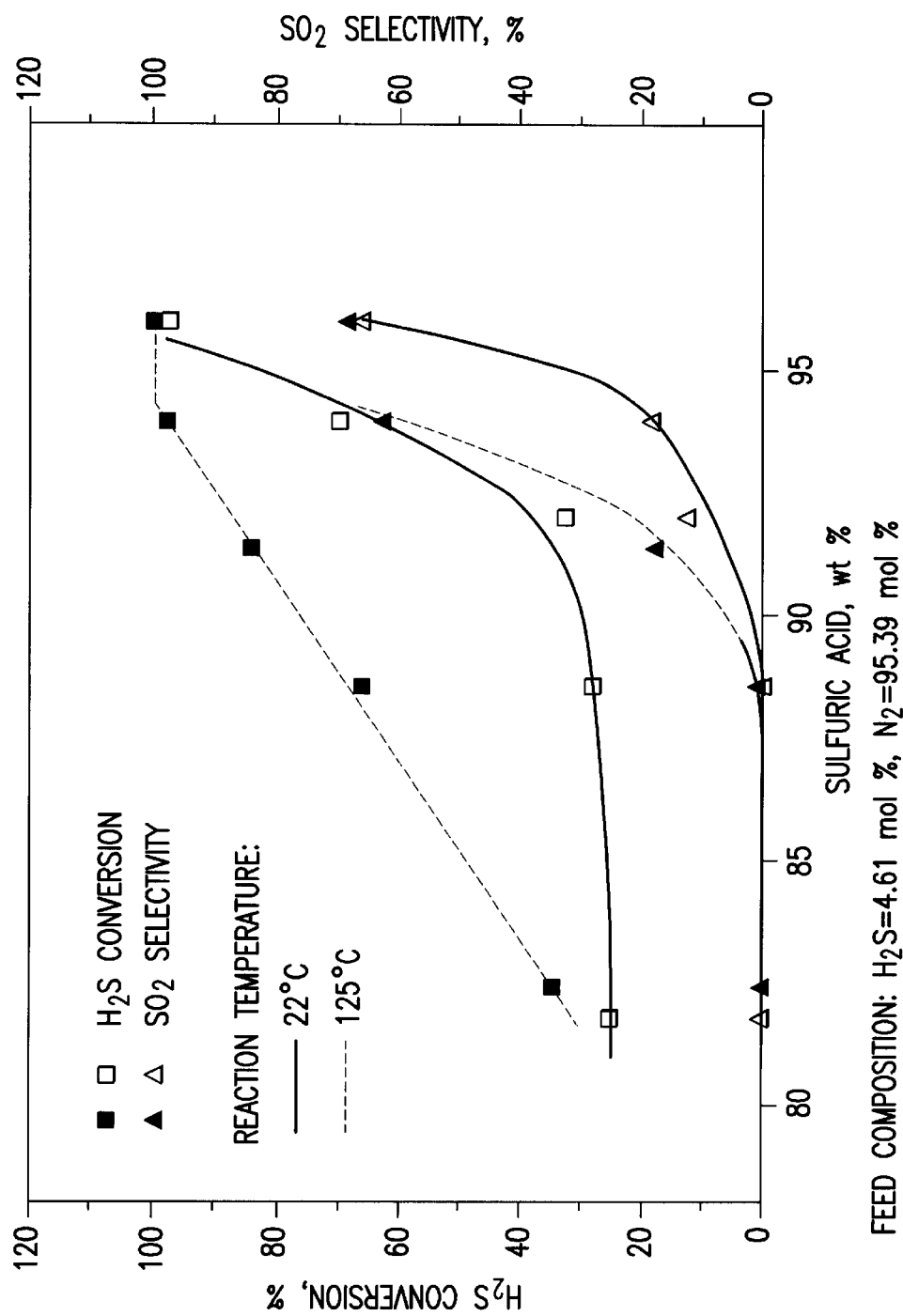

The invention will now be further described by reference to the following examples, tabulated results and FIGS. 3 to 5.

A laboratory scale apparatus (FIG. 3), was used.

The $H_2S$-containing gas stream was fed to the reactor at a flow rate of 260 standard cubic centimetre per minute (SCCM) for Tables 1 to 4, and 26 SCCM for Tables 5 and 6.

The results in Tables 1 to 4 are for a gas feed composition of $H_2S$=4.61 mol % and $N_2$=95.39 mol %; and the results in Tables 5 and 6 are for a gas feed composition of $H_2S$=1.49 mol % and $CH_4$=98.51 mol %.

The gases exiting the reactor were passed through a gas chromatograph (GC) (see FIG. 3) sampling valve by which the feed or product gases may be sampled for GC separation of constituents for analysis.

Each run was conducted over five hours at various temperatures and acid concentrations. The results are shown in Tables 1 to 6 which follow, and in FIGS. 4 and 5.

Referring again to FIG. 3, the mixed gases of $H_2S$ and either $N_2$ or $CH_4$ provided in storage cylinder 11 are fed to the reactor 3 via a mass flow controller (MF) (Side Trak $^{(R)}$, Sierra Instrument). The reactor was made of glass, and was 70 mm I.D. and 145 mm in height. A tube of 10 mm O.D. with a sparger(not shown) at the end inserted into the reactor from the top functioned as the gas inlet. To prevent the back-up of sulfuric acid medium to the mass flow controller if the down stream line was plugged up with product sulfur, a buffer gas bottle 13 was placed in the line between the mass flow controller and the reactor.

Prior to each run, about 500 grams of sulfuric acid solution of varied concentration (from 82 to 96 wt %) was loaded into the reactor. Following a 10 minute purging of the system by $N_2$, the $H_2S$-containing gas was introduced and reacted with the sulfuric acid solution.

The experiments were carried out at temperatures ranging from 22 to 125° C. A hot oil bath was used to maintain the higher temperatures.

The effluent gas exits the reactor for GC analysis, and the results compared to pre-calibration with the $H_2S$ containing gases.

Specifically, Table 1 was conducted at constant sulfuric acid concentration of 96 wt %. Over 97% conversion of $H_2S$ is achieved. However, an undesirably high SO2 selectivity of 66% was observed. It will be appreciated by those skilled in the art that $SO_2$ production is undesirable because of its harmful corrosion, tarnishing and air pollution effects.

Table 2 was conducted at constant sulfuric acid concentration of 88.6 wt %. In the range of temperatures tested of 22 to 127° C., the level of $H_2S$ conversion is below 66.4%. However, a good $SO_2$ selectivity of below 0.6% is observed. It is noted that with decreasing temperature, $H_2S$ conversion decreases and the $SO_2$ decreases to zero.

Tables 1 and 2 thus indicate the significant effect of the concentration of sulfuric acid on $H_2S$ conversion and $SO_2$ selectivity in the reaction. Run 7 represents a good balance between $H_2S$ coversion and $SO_2$ selectivity.

Tables 3 and 4 (and FIG. 4), conducted at varied sulfuric acid concentrations, show the effect of sulfuric acid concentration on $H_2S$ conversion at 22 and 125° C., respectively. Note that with decreasing sulfuric acid concentration, $H_2S$ conversion decreases with the disappearance of $SO_2$.

Tables 5 and 6 (and FIG. 5) further indicate that at a lower gas flow rate (higher contact time), the reaction process more effectively purifies a natural gas stream by converting more $H_2S$ to elemental sulfur. The level of $H_2S$ conversion of over 94 to virtually 100% was achieved, without $SO_2$ being produced. Similar results for $SO_2$ selectivity were later found.

TABLE 1

Gas Feed Composition: $H_2S$ = 4.61 mol %, $N_2$ = 95.39 mol %

| Run | Temp.° C. | $H_2SO_4$ Conc. wt % | $H_2S$ Conv. % | $SO_2$ Sel. % |
|---|---|---|---|---|
| 1 | 21.5 | 96 | 97.4 | 66.05 |
| 2 | 95.0 | 96 | 98.8 | 67.20 |
| 3 | 121.8 | 96 | 100.0 | 67.39 |

TABLE 2

Gas Feed Composition: $H_2S$ = 4.61 mol %, $N_2$ = 95.39 mol %

| Run | Temp.° C. | $H_2SO_4$ Conc. wt % | $H_2S$ Conv. % | $SO_2$ Sel. % |
|---|---|---|---|---|
| 4 | 22 | 88.6 | 28.2 | 0.0 |
| 5 | 54 | 88.6 | 44.2 | 0.0 |
| 6 | 91 | 88.6 | 56.2 | 0.02 |
| 7 | 127 | 88.6 | 66.4 | 0.60 |

TABLE 3

Gas Feed Composition: $H_2S$ = 4.61 mol %, $N_2$ = 95.39 mol %

| Run | Temp.° C. | $H_2SO_4$ Conc. wt % | $H_2S$ Conv. % | $SO_2$ Sel. % |
|---|---|---|---|---|
| 8 | 22 | 96 | 97.4 | 66.1 |
| 9 | 22 | 94 | 70.1 | 18.7 |
| 10 | 22 | 92 | 32.8 | 12.5 |
| 11 | 22 | 88.6 | 28.2 | 0.0 |
| 12 | 22 | 91.9 | 25.3 | 0.0 |

TABLE 4

Gas Feed Composition: $H_2S$ = 4.61 mol %, $N_2$ = 95.39 mol %

| Run | Temp.° C. | $H_2SO_4$ Conc. wt % | $H_2S$ Conv. % | $SO_2$ Sel. % |
|---|---|---|---|---|
| 13 | 125 | 96 | 100 | 67.4 |
| 14 | 125 | 94 | 97.8 | 62.7 |
| 15 | 125 | 92 | 85.2 | 19.7 |
| 16 | 125 | 88 | 66.4 | 0.6 |
| 17 | 125 | 82 | 34.6 | 0.0 |

TABLE 5

Gas Feed Composition: $H_2S$ = 1.49 mol %, $CH_4$ = 98.51 mol %

| Run | Temp.° C. | $H_2SO_4$ Conc. wt % | $H_2S$ Conv. % |
|---|---|---|---|
| 18 | 22 | 96 | 94.4 |
| 19 | 22 | 94 | 93.0 |
| 20 | 22 | 92 | 73.5 |
| 21 | 22 | 88 | 28.9 |
| 22 | 22 | 82 | 11.4 |

TABLE 6

Gas Feed Composition: $H_2S$ = 1.49 mol %, $CH_4$ = 98.51 mol %

| Run | Temp.° C. | $H_2SO_4$ Conc. wt % | $H_2S$ Conv. % |
|---|---|---|---|
| 23 | 125 | 96 | >99.9 |
| 24 | 125 | 94 | >99.9 |
| 25 | 125 | 92 | 97.4 |
| 26 | 125 | 88 | 81.4 |
| 27 | 125 | 82 | 25.5 |

We claim:

1. A method of removing contaminating hydrogen sulfide from a flowing gas stream of natural gas or a flowing gas stream derived from petroleum or from natural gas and producing a product stream consisting essentially of the gas stream, elemental sulfur and water, comprising:
   (1) contacting the contaminated gas stream with a liquid sulfuric acid aqueous medium having a selectable sulfuric acid content of between 80% and 96% by weight;
   (2) reacting the hydrogen sulfide with the liquid sulfuric acid aqueous medium at a selectable temperature between 120° C. and 150° C.; and
   (3) controlling both the sulfuric acid content of the aqueous medium and the reaction temperature such that the hydrogen sulfide is reacted to essentially water and elemental sulfur.

2. A process according to claim 1, wherein the concentration of the sulfuric acid in the aqueous medium is 82 to 96 wt. %, the reaction temperature is between 120° C. and 130° C. and the product stream has no more than 0.6% $SO_2$ therein.

3. A process according to claim 1, wherein the concentration of sulfuric acid is 88 to 92 weight percent.

4. A process according to claim 1, wherein the gas stream is a natural gas stream containing less that 5 mol percent of $H_2S$.

5. A process according to claim 4, wherein the flow rate of the natural gas stream is about 26 SCCM per 500 g of liquid sulfuric acid aqueous medium.

6. A processing according to claim 1, wherein the contact with the liquid sulfuric acid aqueous medium and the contaminated gas stream is by bubbling the gas stream through the acid aqueous medium.

7. A process according to claim 6, wherein the flow rate of the gas stream is 26 to 260 SCCM per 500 g of liquid sulfuric acid aqueous medium.

8. A process according to claim 6, wherein the elemental sulfur is periodically removed and the sulfuric acid is periodically replenished.

9. A process according to claim 8, wherein the process is conducted in a semi-batch reactor vessel holding a volume of the sulfuric acid aqueous medium and the contaminated gas stream is bubbled through that volume.

10. A process according to claim 6, wherein the process is conducted in a packed column reactor and the contaminated gas stream is bubbled through a predetermined volume of the liquid sulfuric acid aqueous medium flowing through the packed column reactor.

11. A process according to claim 1, wherein the concentration of sulfuric acid is 94 to 96 weight percent.

12. A process according to claim 1, wherein the reaction temperature is 125 to 127° C.

13. A process according to claim 1, wherein the process is continuous.

14. The method of claim 1, wherein the reaction is carried out in the absence of catalyst.

15. The method of claim 14, wherein the reaction is carried out in the absence of activated carbon.

16. The method of claim 1, wherein the reaction is carried out in the substantial absence of gaseous oxygen.

17. A process according to claim 1, wherein the contaminated gas stream is contacted with a reaction medium consisting essentially of the liquid sulfuric acid aqueous medium.

* * * * *